(12) United States Patent
Dillow et al.

(10) Patent No.: US 8,713,268 B2
(45) Date of Patent: Apr. 29, 2014

(54) COORDINATED GARBAGE COLLECTION FOR RAID ARRAY OF SOLID STATE DISKS

(75) Inventors: David A. Dillow, Knoxville, TN (US); Youngjae Kim, Lenoir City, TN (US); Hakki S. Oral, Oak Ridge, TN (US); Galen M. Shipman, Oak Ridge, TN (US); Feiyi Wang, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 580 days.

(21) Appl. No.: 13/015,750

(22) Filed: Jan. 28, 2011

(65) Prior Publication Data

US 2012/0036309 A1    Feb. 9, 2012

Related U.S. Application Data

(60) Provisional application No. 61/370,908, filed on Aug. 5, 2010.

(51) Int. Cl.
*G06F 12/00* (2006.01)
*G06F 12/02* (2006.01)
*G06F 3/06* (2006.01)

(52) U.S. Cl.
CPC .......... *G06F 12/0253* (2013.01); *G06F 3/0652* (2013.01); *G06F 3/0679* (2013.01); *G06F 3/0688* (2013.01)
USPC ............................ 711/162; 711/114; 711/152

(58) Field of Classification Search
CPC . G06F 12/0253; G06F 3/0652; G06F 3/0679; G06F 3/0688
USPC .......................................... 711/114, 152, 165
See application file for complete search history.

(56) References Cited

U.S. PATENT DOCUMENTS

| | | | |
|---|---|---|---|
| 5,680,579 A | 10/1997 | Young et al. | |
| 8,166,233 B2 * | 4/2012 | Schibilla et al. | ............... 711/103 |
| 2006/0053308 A1 | 3/2006 | Zimmerman | |
| 2009/0125671 A1 | 5/2009 | Flynn et al. | |
| 2009/0132760 A1 | 5/2009 | Flynn et al. | |
| 2009/0287956 A1 | 11/2009 | Flynn et al. | |
| 2009/0327685 A1 | 12/2009 | Zwisler et al. | |
| 2010/0079885 A1 | 4/2010 | McKean | |
| 2010/0122148 A1 | 5/2010 | Flynn et al. | |

FOREIGN PATENT DOCUMENTS

| | | |
|---|---|---|
| CN | 101504625 | 8/2009 |
| GB | 2407405 | 4/2005 |
| WO | 2004027626 | 4/2004 |

OTHER PUBLICATIONS

Doyle et al., A Modular and Extensible JVM Infrastructure, Proceedings of the 2nd Java Virtual Machine Research and Technology Symposium, Aug. 1-2, 2002.
Lliadis, Performance of the Greedy Garbage-Collection Scheme in Flash-Based Solid-State Drives, Computer Science, Mar. 26, 2010.

(Continued)

*Primary Examiner* — Reba I Elmore
(74) *Attorney, Agent, or Firm* — Scully, Scott, Murphy & Presser, P.C.

(57) ABSTRACT

An optimized redundant array of solid state devices may include an array of one or more optimized solid-state devices and a controller coupled to the solid-state devices for managing the solid-state devices. The controller may be configured to globally coordinate the garbage collection activities of each of said optimized solid-state devices, for instance, to minimize the degraded performance time and increase the optimal performance time of the entire array of devices.

25 Claims, 4 Drawing Sheets

(56) References Cited

OTHER PUBLICATIONS

Patterson, A Case for Redundant Arrays of Inexpensive Disks (RAID), ACM Sigmod, Jun. 1988, pp. 109-116, vol. 17, Issue 3, abstract.

Kim, An Empirical Study of Redundant Array of Independent Solid-State Drives (RAIS), Technical Report, ORNL/TM-2010/61, National Center for Computational Sciences, Mar. 2010.

* cited by examiner

COORDINATED GARBAGE COLLECTION FOR RAID ARRAY OF SOLID STATE DISKS

CROSS-REFERENCE TO RELATED APPLICATIONS

This application claims the benefit of U.S. Provisional Application No. 61/370,908, filed on Aug. 5, 2010, which is incorporated by reference herein in its entirety.

STATEMENT REGARDING FEDERALLY SPONSORED RESEARCH OR DEVELOPMENT

This invention was made with government support under Prime Contract No. DE-AC05-00OR22725 awarded by the U.S. Department of Energy. The government has certain rights in the invention.

FIELD OF THE INVENTION

The present disclosure relates generally to solid state devices and memory management, and more particularly to garbage collection for RAID array of solid state disks.

BACKGROUND OF THE INVENTION

Redundant Array of Independent Disks (RAID) is a technology that utilizes a collection of independent disks in a coordinated fashion to achieve better performance, greater reliability, increased capacity, or a combination of these features. RAID levels 0, 1, 5 and 6 are the most commonly used. RAID level 0 stripes data across all disks in the array to achieve improved performance. Each disk is a single point of failure such that if one disk fails, all data on the array is lost. RAID level 1, on the other hand, targets improved reliability. Data on the array is mirrored across all disks in the array. If one disk fails, data can be accessed through any of the remaining mirrored disks in the array. RAID level 5 combines improved reliability and performance. For each stripe of data blocks, a parity block is computed based on the data blocks and written to a separate disk in the array. There is no dedicated parity disk and in case of a single drive failure, data can be accessed and reconstructed using the remaining disks and the corresponding parity blocks. RAID level 6 provides a reliability improvement over RAID level 5, as it utilizes two independent parity blocks for each stripe of data. It can protect from two drive failures. Other RAID levels are defined in literature, as well. For more details on RAID technology, see "*A Case for Redundant Array of Inexpensive Disks (RAID)*", by David A. Patterson, Garth Gibson, and Randy H. Katz from University of California Berkley dated 1988. Solid State Disks (SSDs), for example, NAND Flash memory-based SSDs, are popular storage media devices alongside magnetic disks. Our experiments using an array of various SSDs in a RAID configuration has revealed a fundamental performance bottleneck. For details on this performance bottleneck, see "*An Empirical Study of Redundant Array of Independent Solid-State Drives (RAIS)*", Y. Kim, S. Oral, D. Dillow, F. Wang, D. Fuller, S. Poole, and G. Shipman, Technical Report, ORNL/TM-2010/61, National Center for Computational Sciences, March 2010.

SSDs are compatible with existing disk technologies including disk drivers, input/output (I/O) buses, system software and operating systems. This compatibility allows easy replacement of individual magnetic disks with SSDs in existing storage systems. SSDs are pure semiconductor devices and do not have any mechanical moving parts (unlike magnetic disks, which are mechanical devices). This eliminates disk head seek latencies and increases performance for various I/O workloads. SSDs are also more resilient to mechanical disturbances compared to magnetic disks. As SSD technologies mature, mass production costs are dropping. This triggers reduced market prices, making SSDs more available to consumers. Altogether, these factors are making SSDs an attractive alternative to magnetic disks.

Current SSD technology supports three basic I/O operations: write, read and erase (magnetic disk technology supports only the first two). The basic unit of data storage is SSDs is a page (a group of flash memory cells, typically in 4 kilobyte (KB) capacity). Pages are further grouped into blocks. Granularity for reads and writes is at the page-level, whereas the granularity of an erase operation is at the block-level in SSDs.

As stated above, SSDs are purely electronic devices (no mechanically rotating or moving parts such as disk heads, rotator arms, etc.). SSDs have consistent read performance (the spatial locality of data on an SSD is irrelevant to the read operation as there is no disk head). However, writing into SSDs is slower and more complicated compared to reading as explained below.

Full system delete operations only flag data blocks as "not in use" at the file system level, using the file system's block usage map. Storage devices (SSDs and magnetic disks) lack an accurate view of this block map (indicating which data blocks are actually in use and which became available). When the operating system writes to a block that was recently freed by the file system (but not by the storage device), it is translated as an overwrite operation at the storage device level. This is not a problem for magnetic disks because there is no difference between writing to a free block and overwriting a used one. Unlike conventional magnetic disks, SSDs require a block to be erased prior to being written. A simple approach to updating data within a block on an SSD given this constraint, would be to read the block into volatile memory, modify the block in memory with the updated data, erase the underlying block, and finally write the updated data from volatile memory. This approach is defined as a read-modify-erase-write. Unfortunately erase operations on SSDs have higher overhead on SSD devices when compared to read and write operations making this read-modify-erase-write cycle inefficient. To overcome these inefficiencies, SSDs use a copy-on-write operation in which the contents of a block are copied into the memory and modified there, then written to a known free block. The original target block for the overwrite operation is then marked as "invalid." Although this is more efficient compared to the read-erase-modify-write method (since it does not require an erase operation), the number of available free blocks decreases over time and must be reaped/reclaimed. SSDs solve this problem by using a mechanism called garbage collection (GC). GC is a term defining the process of reclaiming "invalidated" pages and creating usable free space on an SSD. Current SSD technology uses GC processes controlled by the SSD with different algorithms and policies that are vendor specific. Generally, during an ongoing GC process incoming requests are delayed until the completion of the GC if their target is the same Flash chip that is busy with GC. For example, during an ongoing GC process incoming requests targeted for the same Flash device that is busy with the ongoing GC process are stalled and placed in a queue and scheduled for service following the completion of the GC process. This stalling can degrade performance when incoming requests are bursty.

Fragmentation caused by small random writes increases the GC overhead. It has been empirically observed that GC activity is directly correlated with the frequency of write operations, the amount of data written, and the free space on the SSD. Under certain circumstances, the garbage collection (GC) process can significantly impede SSD I/O performance (e.g., overlapping writes with an on-going GC process). See "An Empirical Study of Redundant Array of Independent Solid-State Drives (RAIS)", Y. Kim, S. Oral, D. Dillow, F. Wang, D. Fuller, S. Poole, and G. Shipman, Technical Report, ORNL/TM-2010/61, National center for Computational Sciences, March 2010.

Using SSDs in a RAID array configuration for increased storage capacity and performance is an attractive idea since a collection of SSDs presents a cost-effective solution in terms of price/performance and price/capacity ratios for various I/O workloads compared to a single SSD device of similar capacity and performance.

With current SSD technology, GC processes for individual SSDs are local and there is no coordination at the RAID-controller level. This lack of coordination causes individual GC processes to execute independently resulting in aggregate performance degradation at the RAID level.

SUMMARY OF THE INVENTION

An optimized redundant array of solid state devices and a method thereof may be provided. The optimized redundant array of solid state devices, in one aspect, may include an array of one or more optimized solid state devices, and a controller coupled to the solid state devices for managing the solid state devices. The controller, in one embodiment, is configured to globally coordinate the garbage collection activities of the optimized solid-state devices participating in the globally coordinated garbage collection.

A method of optimizing performance of a redundant array of individual solid state devices, in one aspect, may include a controller connected to the array communicating with the individual solid state devices. The method may also include the controller coordinating garbage collection activities of each of the individual solid-state devices.

A computer readable storage medium storing a program of instructions executable by a machine and/or one or more computer processors to perform one or more methods described herein may be also provided.

Further features as well as the structure and operation of various embodiments are described in detail below with reference to the accompanying drawings. In the drawings, like reference numbers indicate identical or functionally similar elements.

DETAILED DESCRIPTION OF THE INVENTION

Figure 1:
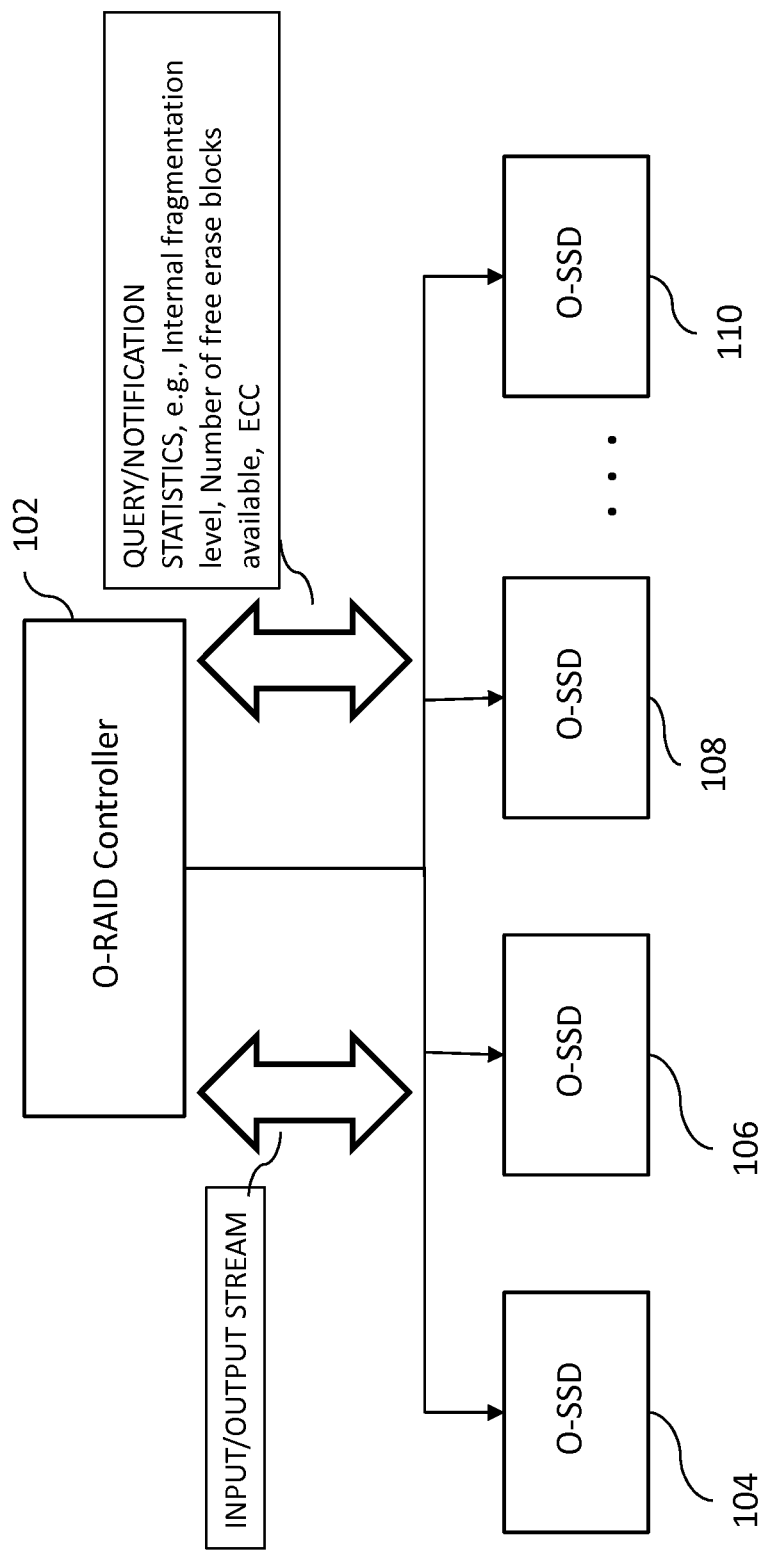
FIG. 1 illustrates an architecture of a GCC optimized SSD RAID array in one embodiment of the present disclosure.

A global garbage collection (GGC) mechanism is disclosed for solid state devices SSD architected in a RAID array. The GGC mechanism of the present disclosure in one embodiment may implement and utilize an SSD-aware RAID controller and GGC-capable SSD devices, as well as algorithms to coordinate the GGC cycles. A globally coordinated garbage collection (i.e., GGC) mechanism of the present disclosure may improve response times and reduce performance variability for a RAID array of SSDs, e.g., reduce the effect of an aggregate performance degradation present in a RAID array of SSDs.

The following terms are used in the present disclosure to describe one or more embodiments, but are not intended to limit the scope of the invention.

RAID: RAID is an acronym for redundant array of inexpensive disks or redundant array of independent disks. RAID defines a technology that allows high levels of storage reliability and/or aggregate input/output performance using low-cost and less reliable disk devices (David A. Patterson, Garth Gibson, and Randy H. Katz, "*A Case for Redundant Arrays of Inexpensive Disks* (*RAID*)," University of California Berkley, 1998). When multiple disk devices are set up to use RAID technology, they are said to be in a RAID array. Such a RAID array distributes data across multiple disks, but the array is presented as one single disk. Every RAID array has two basic components: a RAID controller, which manages attached disk devices; and physical disk devices that are attached to the RAID controller.

SSD: SSD is an acronym for solid-state drive. An SSD is a data storage device that uses solid-state memory to store persistent data. An SSD emulates a hard disk drive interface, thus easily replacing it in most applications.

Garbage Collection: Garbage collection (GC) is a form of automatic memory management. The garbage collector attempts to reclaim garbage, or memory occupied by objects that no longer hold the most current data for a logical sector. In SSDs the local background GC processes reclaim space (blocks) from pages marked as garbage, eliminating the need to perform erasure of the whole block prior to every write.

Global Garbage Collection: Global garbage collection (GGC) is a technology introduced in the present disclosure providing the capability of scheduling and performing a globally coordinated and synchronized garbage collection process over all SSDs in a given RAID array.

O-RAID: O-RAID is an acronym, introduced in the present disclosure, for optimized RAID. O-RAID defines a RAID technology providing global garbage collection capability besides conventional RAID controller functionalities and capabilities.

O-SSD: O-SSD is an acronym, introduced in the present disclosure, for optimized SSD. O-SSD defines an SSD device technology supporting the global garbage collection process in addition to conventional SSD functionalities and capabilities.

In one embodiment of the present disclosure, the following capabilities may be provided:

- A RAID controller optimized for SSD-based RAID arrays with a global garbage collection coordination capability. This optimized RAID controller is referred to as "SSD optimized RAID controller" (O-RAID).
- An SSD controller designed for participating in a globally coordinated garbage collection process in a RAID array of SSDs. This new SSD controller is referred to as "Global GC optimized SSD controller" (O-SSD).
- A new device-level programming interface (API) to establish communication between the SSD optimized RAID controller and the Global GC optimized SSD controller. This API provides the functionality to schedule and control the execution of global garbage collection processes over all or a subset of SSDs in a given RAID array.

A set of algorithms to perform a globally coordinated GC process on a given SSD-based RAID set comprising an O-RAID and multiple O-SSD devices. The set of algorithms may include a new set of communication protocols between the SSD optimized RAID controller and the Global GC optimized SSD controller.

Extension of storage protocols such as Serial Advanced Technology Attachment (SATA) and Small Computer System Interface (SCSI) for controlling the additional capabilities of O-SSD devices. SATA and SCSI may be used as interfaces for storage. Briefly, SCSI is a bus allowing connection of several drives on one shared channel. SATA is a bus allowing connection a one drive per channel. The global garbage collection algorithms of the present disclosure in one embodiment may be implementable on top of those storage interfaces, for instance, by augmenting existing storage protocols.

FIG. 1 illustrates an architecture of a GCC optimized SSD RAID array. In one embodiment, for the O-RAID controller 102 to make use of the extended features of O-SSD devices (e.g., 104, 106, 108, 110), it discovers that those features are available. Several different methods may be used by the O-RAID controller 102 for such discovery, for example: Assumption/Requirement by design: In this method, the O-RAID manufacturer specifies that only O-SSD capable devices be allowed in the system. The O-RAID controller is then free to assume the presence of the capabilities.

Device Inquiry: In this method, the O-RAID controller 102 queries each of the devices under its control to determine the feature set supported. O-SSD (e.g., 104, 106, 108, 110) devices would respond with the appropriate information declaring the extended features it supports.

Broadcast: As part of the initialization sequence of the O-SSD device (e.g., 104, 106, 108, 110), the extended capabilities are broadcast out to interested listeners such as the O-RAID controller 102. Any time a new device is introduced to the system—or re-introduced via a device reset, O-RAID controller 102 determines the feature set of the devices it controls. In addition, O-RAID 102 may operate at the global level with global knowledge obtained from O-SSD (e.g., 104, 106, 108, 110), while an O-SSD (e.g., 104, 106, 108, 110) only has local knowledge in the form of internal fragmentation level, number of available blocks, and other similar information used to determine when to start its GC process. Global garbage collection may provide maximum effectiveness when all SSD devices in a given RAID set support the GGC capability. Reduced benefits may be obtained if more than one device offers support.

Global garbage collection of the present disclosure in one embodiment is performed on per-array basis and each array is operated independently of other arrays managed by the O-RAID controller 102. It is possible to have a mix of optimized and non-optimized arrays managed by the same O-RAID controller 102. It is also possible for the O-RAID controller 102 to be configured to not use global garbage collection for a given array even though all devices (e.g., 104, 106, 108, 110) in the array may support it.

In one embodiment of the present disclosure, when all active devices in a given O-RAID volume group are capable of O-SSD operation, the O-RAID controller 102 coordinates the garbage collection activities of the constituent devices. The GCC of the present disclosure provides coordination for achieving the performance benefits of GCC. There may be a plurality of modes (methods) of coordination, active (also referred to as reactive soft-limit), passive (also referred to as proactive soft-limit) and proactive idle. The modes of coordination may be combined. For instance, proactive idle mode may be utilized in combination with active or passive modes.

Figure 2:
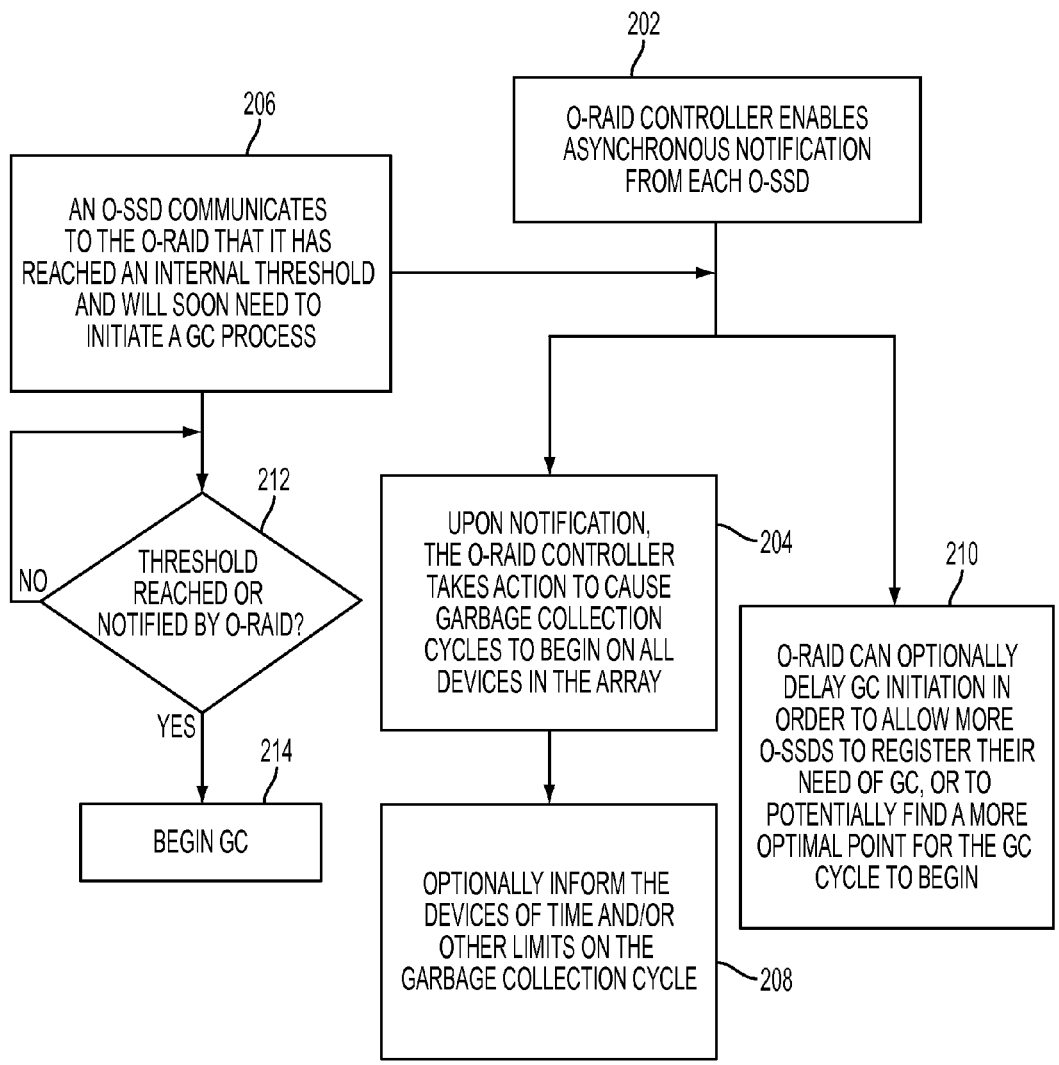
FIG. 2 is a flow diagram illustrating globally coordinated garbage collection using active mode in one embodiment of the present disclosure.

FIG. 2 is a flow diagram illustrating globally coordinated garbage collection using active mode in one embodiment of the present disclosure. In active mode, the O-RAID controller takes action to enable asynchronous notification of garbage collection needs from the O-SSD devices at 202. At 204, upon notification of an impending need for garbage collection from an O-SSD device (e.g., at 206), the O-RAID controller in this mode takes action to cause garbage collection cycles to begin on all devices in the array. As shown at 208, this action may optionally inform the devices of time and/or other limits on the garbage collection cycle to maintain a similar level of request processing delay across the array.

In this mode (also referred to as reactive soft-limit method), for example, an O-SSD communicates to the O-RAID that it has reached an internal threshold and will soon need to initiate a GC process, for example, shown at 206. This communication may also provide additional information to the O-RAID such as an estimate of how much data could be written before a hard threshold is reached and an uncoordinated GC process must be initiated. Once the O-RAID has been notified, it will ask each GGC-capable device in the RAID set to initiate a GC cycle (204). At 210, the O-RAID can optionally delay this initiation in order to allow more O-SSDs to register their need of GC, or to potentially find a more optimal point in the request stream for the GC cycle to begin. If the O-RAID chooses to delay the GC cycle, it can use the additional information from the notification to avoid triggering uncoordinated GC.

In this mode, the O-SSD will delay its GC cycle until it reaches a hard threshold where it must begin a GC cycle. In one embodiment, the O-SSD's communication to the O-RAID of the need for GC is advisory in nature, and the lack of a response from the O-RAID may not prevent the O-SSD from performing needed GC. Thus, for example, at 212, if the O-SSD reaches its hard threshold or is notified by O-RAID controller, the O-SSD performs its garbage collection activities at 214.

Figure 3:
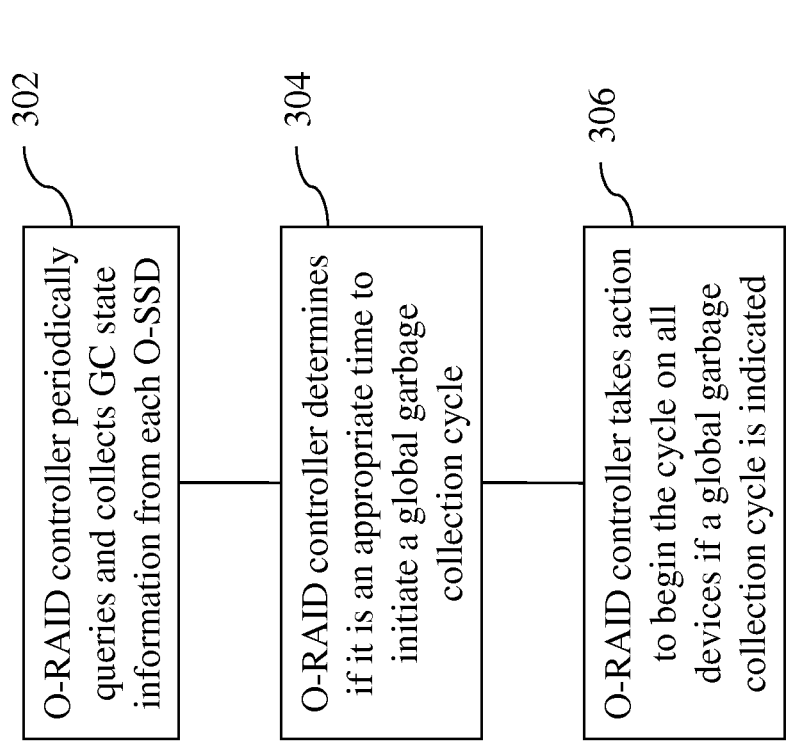
FIG. 3 is a flow diagram illustrating globally coordinated garbage collection using passive mode in one embodiment of the present disclosure.

FIG. 3 is a flow diagram illustrating globally coordinated garbage collection using passive mode in one embodiment of the present disclosure. In passive mode (also referred to as proactive soft-limit method), the O-RAID controller may periodically query the devices in the volume group about statistics relating to their garbage collection processes at 302. The O-RAID controller then passes these statistics through a decision function to determine if it is an appropriate time to initiate a global garbage collection cycle at 304. This decision function can make its determination based on an individual device's information, or by aggregating the device data and checking the properties of the entire population of O-SSDs. Again, if a global garbage collection cycle is indicated, action is taken to begin the cycle on all devices at 306, optionally informing them of time and/or other limits to be imposed on the activity.

In this mode, the O-RAID periodically collects GC state information from each O-SSD. This information collection can be initiated by the O-RAID via a pull mechanism, or each O-SSD can periodically push the information to the O-RAID. A combination of both methods may also be used (i.e., pull by O-RAID and push by O-SSD). The O-RAID uses the collected information to determine when each O-SSD has reached a state in which a GGC cycle would be beneficial, and may attempt to find an optimal point in the input/output (I/O) stream to initiate it.

State information useful for determining the need for a GC cycle may include, but is not limited to:

Internal fragmentation level (ratio of free to used erase blocks);

Number of free erase blocks available;

ECC (error correction code) correctable error rate on reads. ECC adds redundant data or parity data to an original data such that the data can be recovered in the event errors on the original data occur.

In the proactive idle method, the O-RAID may identify points in the I/O stream that are expected to have extended idle periods, and initiates a GGC cycle during those lulls in activity.

In either mode, it is also possible for the O-RAID controller to suggest a garbage collection cycle to the volume set when it detects and/or predicts sufficient idle time in the request stream to allow progress to be made on existing garbage.

In either mode, the O-SSD maintains its ability to self-initiate garbage collection cycles to maintain proper operation when its internal hard limits are reached, although the O-RAID and global garbage collection protocols function to reduce the need for these independent cycles.

Figure 4A:
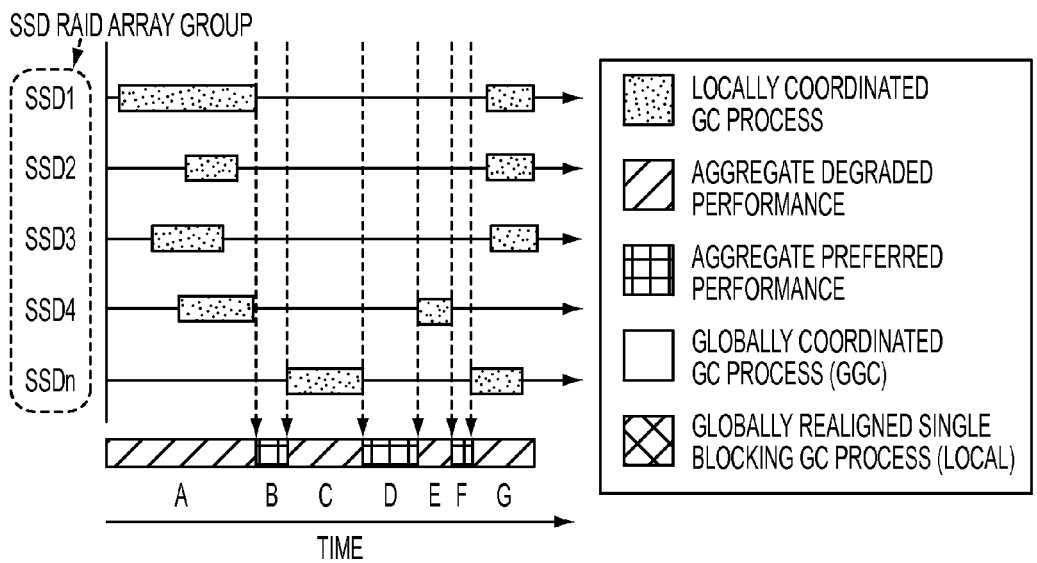
FIGS. 4A and 4B show conceptual timings of GC processes for a given RAID array, with time on the horizontal dimension.
Figure 4B:
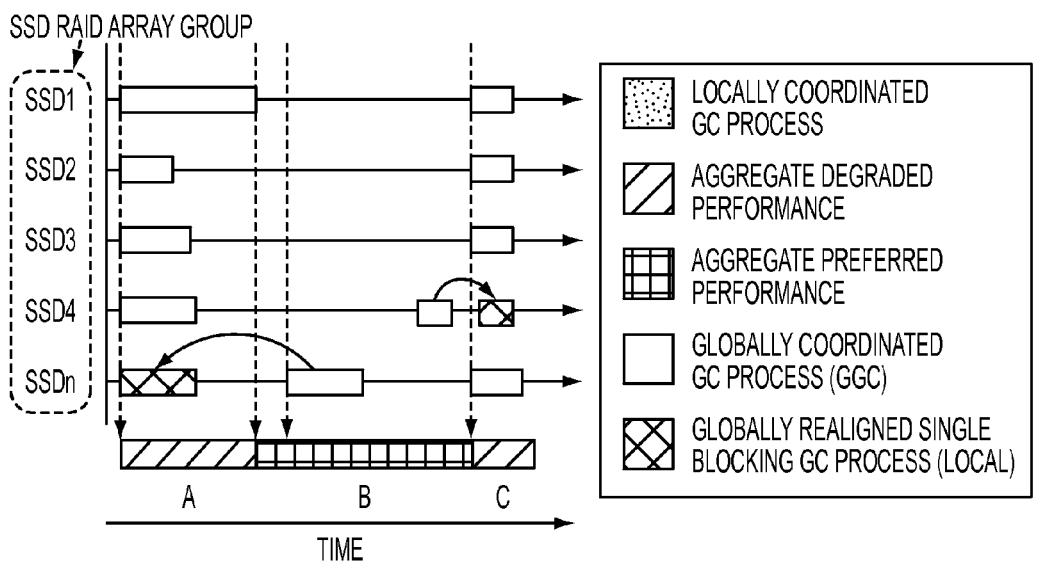

FIGS. 4A and 4B show conceptual timings of GC processes for a given RAID array, with time on the horizontal dimension. The time line is divided into windows—A through G—as the array transitions from peak to degraded performance due to local GC processes. Peak performance at the RAID level is achieved when there is no active GC process on any SSD. Degraded performance occurs when an I/O operation spans even a single device with an active GC process. Assuming full stripe operations, the RAID array in FIG. 4A only achieves its peak performance in time windows B and D. The array is limited to degraded performance in windows A and G due to multiple devices performing GC, as well as in windows C and E due to a single device with active GC.

FIG. 4B shows the effects of the disclosed mechanism to coordinate and synchronize the local GC processes of each SSD according to one embodiment of the present disclosure. In this mechanism, GC processes are shifted in time to allow longer windows of peak performance from the RAID array. By advancing the GC process in FIG. 4A window C to occur simultaneously with the other processes in window A, the mechanism of the present disclosure in one embodiment eliminates one source of degraded performance. Similarly, delaying the GC in window E to window G allows more opportunity for the RAID controller to issue operations that do not span devices with active GC processes.

The methodologies described in the present disclosure may apply to various configuration of SSD-based RAID storage. RAID storage using solid-state disk drives (SSDs) instead of hard disk drives (HDDs) are referred to as RAIS. RAIS-0, 5 and 6 may be defined analogously to RAID-0, 5 and 6 as follows:

RAIS-0: A request is striped across multiple SSDs. As there is no redundancy in the storage, data loss will occur if an SSD fails.

RAIS-5: A request is striped across multiple SSDs with parity data across multiple SSDs. In RAIS-5, there is no dedicated parity SSD. Instead, the parity is distributed over all SSDs in a round-robin fashion, enabling writing data and parity blocks all the SSD in the array, protecting from a single SSD failure.

RAIS-6: Different than RAIS-5, a request is striped with dual parity blocks over all SSDs. It is logically a combination of n−2 data SSDs and 2 additional parity SSDs among n number of SSDs. It can protect data against any two SSD failures.

In addition, the GGC methods described in the present disclosure may apply to any RAID array configurations, for instance, RAID-0, RAID-5 and RAID-6 configurations and others.

Our experiments evaluating SSD-based RAID sets show that the performance of an SSD can be highly impeded by local GC processes. This performance degradation is referred to in this disclosure as pathological behavior of an SSD. We empirically identified that such pathological behavior can be worse in RAID configurations compared to individual SSDs as GCs are scheduled independently by each SSDs in an array. The following paragraphs describe how the effects of GC in SSD and SSD-based RAID were identified and observed. Further, the observation of the improvements effected by applying the inventive globally coordinated GC of the present disclosure on the SSD-based RAID is described below.

In order to empirically observe the effect of GC and to establish a baseline performance response of an individual SSD, we performed a series of experiments using various COTS SSDs and RAID controllers. Experiments were performed on a single server with 24 GB of RAM and an Intel Xeon Quad Core 2.93 GHz CPU. The operating system was Linux with Lustre-patched 2.6.18-128 kernel. The noop I/O scheduler that implements FIFO queueing was used. The testbed has seven 8x PCIe slots and two were populated with LSIMegaRAID SAS 9260-8iKIT PCIe RAID Adapters, each of which can support up to 8 SATA drives.

We examined two representative SSDs that are detailed in Table 1. We selected the Super Talent 128 GB FTM28GX25H SSD as a representative of multilevel cell (MLC) SSDs with SATA interfaces and the Intel 64 GB SSDSA2SH064G101 SSD as a representative of single-level cell (SLC) SSDs. We denote the SuperTalent MLC, and Intel SLC devices as SSD (A), and SSD(B) in the remainder of this study, respectively.

We examined the I/O bandwidth responses of individual COTS SSD for a workload described in Table 2.

TABLE 1

SSD characteristics

| Label | SSD(A) | SSD(B) |
|---|---|---|
| Company | Super-Talent | Intel |
| Type | MLC | SLC |
| Interface | SATA-II | SATA-II |
| Capacity (GB) | 120 | 64 |
| Erase (#) | 10-100K | 100K-1M |
| Power (W) | 1-2 | 1-2 |

TABLE 2

Queue depths and request sizes.

| RAID 0 | 1 SSD (No) | 4 SSDs (Yes) | 6 SSDs (Yes) |
|---|---|---|---|
| Queue depth | 64 | 64 | 64 |
| Request size | 313 KB | 1.25 MB | 1.87 MB |

To measure the I/O performance, we used a benchmark tool that uses the libaio asynchronous I/O library on Linux. The libaio provides an interface that can submit one or more I/O requests in one system call iosubmit( ) without waiting for I/O completion. It also can perform reads and writes on raw block devices. We used the direct I/O interface to bypass the operating system I/O buffer cache by setting the O-DIRECT and O-SYNC flags in the file open( ) call. In order to conduct a fair comparison for the performance variability, we exercised the same per SSD I/O load to SSDs (request size=1/(number of drives in RAID of SSDs)). A high queue depth (number of outstanding requests in the I/O queue) is used to observe the impact of GC in time domain. Also, we varied the percentage of writes in workloads between 20% and 80% in increasing steps of 20%. We measured I/O bandwidth in one second intervals.

Our results for individual SSDs (particularly, time-series analysis results for workloads that are more than 20% writes), we observe that the bandwidth fluctuates more widely due to GC activity as we increase write percentage. For the 80% write dominant I/O workload, the SSD(A) I/O throughput drops below the peak performance (170 MB/s) at the 10th second. I/O throughput drops below 166 MB/s at the 19th second and then drops further to 152 MB/s in the next 10 seconds. Overall, SSD(B) shows higher bandwidth than SSD (A) with a similar variance for all workloads we examined, even though SSD(B) is an SLC, while SSD(A) is an MLC. For instance, SSD (B)'s I/O throughput reached 210 MB/s at the peak for a workload of 80% writes and dropped to 183 MB/s. As we increased the amount of reads in the workloads from 20% to 80%, we observed that SSD(A)'s and (B)'s I/O throughput increased by 41% and 28%, respectively.

We extend our experiments to arrays of COTS SSDs. We used two PCIe interfaced hardware RAID controllers for each configuration. We configured RAID of SSDs as given in Table 3 and experimented with a workload described in Table 2. RAID(A) and (B) were configured as level 0 arrays for a workload mix of writes and reads by varying write percentage in time-series plot. Similar to performance and variability tests with single SSDs, we observe high performance variability in both RAID(A) and (B). However, our observations that RAID sets present much higher performance variability than single SSDs.

TABLE 3

Settings of the LSI MegaRAID Controller.

| RAID | Scheme 0 |
|---|---|
| Device (#) | 4, 6 |
| Write Cache | Write Through |
| Read Ahead | No |
| Direct I/O | Yes |
| Stripe Size | 256 KB |

For more accurate analysis and comparison, we normalized bandwidth with a Z-transform and plotted density functions and used curve-fitting techniques. We compared throughput variability for SSD RAIDs and single SSDs for a workload of 60% writes. We compared a single SSD and RAID level 0 with 4 and 6 SSDs in terms of performance variability. Since we observed that the coefficient of variance (that is)

$$C_v = \frac{\sigma}{\mu}$$

is the highest when write percent-age is 60% in our experiments, we show analysis results for 60% writes of workloads as representative experimental results. Coefficient of variation ($C_v$) is a normalized measure of dispersion of a probability distribution.

We observe the performance variability exhibited by RAID of SSDs far exceeds the projected linear relationship between single SSD and RAID of SSDs. In a perfect setting, the bandwidth of SSD RAID-0 scales linearly compared to a single SSD and its statistical standard deviation is therefore n times of the single SSD's, where n is the number of SSDs in the RAID array. Our conjecture is that uncoordinated GC operations are increasing performance variability. We observe that the performance variability can further increase as we increase the number of SSDs in RAID. Furthermore, we also observe that performance variance increases more rapidly for RAID arrays of MLC SSDs compared to their SLC counterparts, with increasing number of SSDs in an array.

The high variability of system performance in terms of I/O bandwidth and system response times makes the system less reliable as system response cannot be guaranteed. Thus, performance robustness of systems becomes as important as providing high performance, such that a robust system can operate with certain variations. With the current SSD and RAID controller technologies, GC processes per individual SSDs are local. COTS RAID controllers are not aware of any ongoing GC processes at SSDs, therefore there is no coordination at the RAID controller level. This lack of coordination causes individual GC processes per SSD to execute independently, resulting in aggregate performance degradation and response time variability at the RAID level.

The following paragraphs describe the simulation results achieved in SSD-based RAID array implementing the globally coordinated garbage collection of the present disclosure in one embodiment. We extended the SSD simulator developed by Microsoft™ Research (MSR) to evaluate our proposed GGC-optimized RAID array. The MSR SSD simulator is an enhancement of DiskSim from the CMU Parallel Data Lab. Although the MSR SSD simulator has only recently been released to the public, it has been used in several studies. The DiskSim simulator has been also widely used for research and development and has been extensively validated.

TABLE 4

RAID-0 configuration.
RAID model

| # of SSDs | 8 |
|---|---|
| Stripe unit | 4 KB |

TABLE 5

SSD model parameters.
SSD model

| Total capacity | 32 GB |
|---|---|
| Reserved free blocks | 15% |
| Minimum free blocks | 5% |
| Cleaning policy | greedy |
| Flash chip elements | 64 |
| Planes per package | 4 |
| Blocks per plane | 512 |
| Pages per block | 64 |
| Page size | 4 KB |
| Page read latency | 0.025 ms |
| Page write latency | 0.200 ms |
| Block erase latency | 1.5 ms |

For the baseline COTS RAID environment, we configured DiskSim to simulate a RAID-0 array described by Table 4. The MSR SSD simulator was configured such that each SSD presented the specifications shown in Table 5. In the baseline configuration, there is no coordination of the internal garbage collection for each SSD. We extended the baseline DiskSim and MSR SSD environment to implement the reactive soft-limit coordination method. In this algorithm, the initiator SSD in the array is set as the GGC global coordinator. Unless individual SSDs receive an event of FORCE GC, they operate as normal (without a global GC coordination). Otherwise they are forced to start GGC process. Algorithm 1 and 2 describe the reactive GGC scheme from the O-RAID and O-SSD point of views, respectively.

In Algorithm 1, the O-RAID receives a GGC request message from the initiator SSD ($S_{coordinator}$). Upon receiving this message, O-RAID prepares to schedule a GGC event. It iterates over all connected devices and for each device and every stale/invalid element issues a Forced GC event. As explained in Algorithm 2, regardless of the source of the GC event, a local garbage collection process will be triggered to clean the stale/invalid elements until the number of free blocks exceeds an internal threshold.

---

Algorithm 1: O-RAID controller.
Input: GGC coordinating SSD: $S_{coordinator}$; GGC
  event: Forced GC; NRAID = Total number
  of SSDs; $M_{SSD}$ = Total number of elements
  per SSD;
/* Probing if Scoordinator runs local GC */
if $S_{coordinator}$ runs GC then
    foreach i < NRAID do
        foreach j < $M_{SSD}$ do
            event = create Forced GC event( );
            schedule_GGC(event, i, j);
Algorithm 2: O-SSD controller.
Input: Local GC event: Local GC; $M_{SSD}$ = Total
  number of elements per SSD;
if $event_{type}$ is Local GC or $event_{type}$ is Forced GC then
    foreach i < $M_{SSD}$ do
        schedule_local_GC($event_{type}$, i);
    end
end

---

Algorithms 1 and 2 are examples of globally coordinated garbage collection algorithms. The present disclosure in one embodiment also defines APIs for establishing communication between the SSD optimized RAID controller and the Global GC optimized SSD controller, for instance, to schedule and control the execution of global garbage collection processes over all or a subset of SSDs in a given RAID array. In the above example algorithms (Algorithm 1 and 2), examples of the defined APIs may include creating Forced GC event( ) schedule_GGC(event, i, j), schedule_local_GC (event_type, i). Other APIs may be provided.

We use a wide spectrum of workloads from industry and research sources to evaluate the performance of our GGC method. As listed in Table 6, these workloads include both read and write dominated traces, as well as a number of synthetic workloads. This broad spectrum was chosen to obtain a more realistic view of the benefits of coordinated garbage collection.

TABLE 6

Description of workloads.

| Workloads | Avg. Req. (KB) | Size Read (%) | Arrival Rate (IOP/s) |
|---|---|---|---|
| TPC-C | 7.06 | 20.50 | 388.32 |
| Openmail | 9.49 | 63.30 | 846.62 |
| TPC-H | 31.62 | 91.80 | 172.73 |
| Financial | 7.09 | 18.92 | 47.19 |
| Cello | 7.06 | 19.63 | 74.24 |
| Synth1 | 510.53 | 20.12 | 476.50 |
| Synth2 | 510.53 | 80.08 | 476.50 |

While many of the traces are documented in the literature, the synthetic workloads Synth1 and Synth2 are not. These workloads exhibit large, bursty requests. Synth1 is a write-dominated (80%) workload that represents I/O patterns in HPC systems as they periodically write checkpoint states and large result files during their calculations. Synth2 is a read-dominated (80%) workload that represents heavy read patterns of HPC environments.

While the device service time captures the overhead of garbage collection and the device's internal bus contention, it does not include queuing delays for requests pending in the I/O driver queues. Additionally, using an average service time looses information about the variance of the individual response times. In this study, we utilize (i) the response time measured at the block device queue and (ii) the variance in these measurements. This captures the sum of the device service time and the additional time spent waiting for the device to begin to service the request.

Prior to collecting performance data from the simulator, we fill the entire space on each SSD with valid data. This ensures that GC is required on the SSD devices as new write requests arrive during the experimental run.

We compare the response times of the GGC-enhanced RAID compared to the baseline. The average response time for GGC was normalized with the respect to the baseline configuration. For the real-world traces, we observe up to a 10% improvement in average system response time. For the synthetic HPC workloads, we note a 55% improvement for the Synth2 read-dominated load and a 70% improvement for the Synth1 write-dominated load.

A system can be said to be robust if the response time can be predictable and it is capable of working with minimal variances. We observed the variance of response times for each workload in our experiments. Standard deviations for each workload were observed. For the real-world traces, GCC improves of the response time standard deviation by 53.8% on average, while the more bursty synthetic workloads can achieve up to a 73.8% improvement. GCC improves the robustness and predictability of the storage system.

By varying the rate at which I/O requests were injected during the synthetic workloads, we were able to observe the performance of the RAID set as it transitions from a low arrival rate to an extremely high rate of requests. The baseline configuration gives very high response times when the workload is write intensive. In addition, there is a very large gradient in the response time and variability as the arrive rate quickens, with an inflection point near 7,000 IOP/s. This behavior does not provide a robust system response. In contrast, our GGC method maintains lower average response times than the baseline, and a more gradual increase in variability. This confirms that GGC can help deliver a robust and stable system. For read-dominated workloads, GGC continues to deliver improved performance and system robustness.

A set of consecutive requests serviced by two of the eight SSD devices in our simulated RAID were observed. The response time for each request was captured during a 300 ms interval in the Synth1 workload by both the baseline and our GGC method. It is observed that the baseline incurs larger and more frequent overhead from GC collection which results in larger latencies than GGC. The overall RAID response latency is a function of the convolution of the response time of each SSD in the array, and is determined by the slowest device.

While the experiments above were performed with eight SSDs in the RAID set, we also investigated how the number of devices in the array affected the performance. We compared the average response time under the Synth1 workload as the size of the RAID set is varied. Both configurations improved their performance as size increased. However, GCC maintains a performance edge over the baseline throughout the experiment. At two SSDs, the baseline response time was 2.7 times longer than GCC, and the margin grew to 3.2 times as we expanded the RAID set to 18 SSDs. It is interesting that the baseline requires eight SSDs to provide a response time equivalent to that delivered by two devices using GGC. Even with 18 devices in the RAID set, baseline is unable to do better than 184% of the 4 device set using GGC.

We evaluated the impact of GGC using this simulation environment against realistic workloads and observed the system response times and performance variability. Response time and performance variability was improved for all workloads in our study. In particular, for bursty workloads dominated by large writes, we observed a 69% improvement in response time and a 71% reduction in performance variability when compared to uncoordinated garbage collection.

The above described study described with reference to identifying and observing the degradation of performance in SSD-based RAID arrays and the improvement observed when using the novel globally coordinated garbage collection mechanisms of the present disclosure are shown to only provide examples and for illustrative purposes. Thus, that description including the various components and devices used to perform the study should not be construed in any way to limit the globally coordinated garbage collection mechanisms disclosed in the present disclosure.

Various aspects of the present disclosure may be embodied as a program, software, or computer instructions stored in a computer or machine usable or readable storage medium, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

As used in the present disclosure, the singular forms "a", "an" and "the" are intended to include the plural forms as well, unless the context clearly indicates otherwise.

The components of the flowcharts and block diagrams illustrated in the figures show various embodiments of the present invention. It is noted that the functions and components need not occur in the exact order shown in the figures. Rather, unless indicated otherwise, they may occur in different order, substantially simultaneously or simultaneously. Further, one or more components or steps shown in the figures may be implemented by special purpose hardware, software or computer system or combinations thereof.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. An optimized redundant array of solid state drives comprising:
    an array of two or more optimized solid state drives; and
    a controller coupled to the solid state drives for managing the solid state drives, said controller configured to globally coordinate the garbage collection activities of each of said optimized solid-state drives participating in the globally coordinated garbage collection.

2. The optimized redundant array of solid state drives of claim 1, wherein the garbage collection is coordinated by the controller in an active mode in which one or more of the optimized solid-state drives communicate to said controller a need to initiate a garbage collection activity, and said controller in response to receiving the communication, requests all of the solid-state drives in the array to initiate a garbage collection activity so that garbage collection cycles begin on all of the solid-state drives in the array at a scheduled time.

3. The optimized redundant array of solid state drives of claim 2, wherein said controller in response to receiving the communication, delays requesting all of the solid-state drives in the array until another communication for a need to initiate a garbage collection activity is received from another one or more of said optimized solid state drives.

4. The optimized redundant array of solid state drives of claim 2, wherein said controller in response to receiving the communication, delays requesting all of the solid-state drives in the array to begin the garbage collection cycles.

5. The optimized redundant array of solid state drives of claim 1, wherein the garbage collection is coordinated by the controller in a passive mode, in which the controller periodically collects information from at least one of said two or more solid state drives in the array to determine an appropriate time to initiate a global garbage collection cycle and initiates the global garbage collection cycle at said determined appropriate time on said two or more solid state drives in the array.

6. The optimized redundant array of solid state drives of claim 5, wherein the controller collects by pulling said ene two or more solid state drives for the information, or said one or more solid state drives pushing the information to the controller, or combinations thereof.

7. The optimized redundant array of solid state drives of claim 6, wherein the information includes internal fragmentation level, number of free erase blocks available, or ECC correctable error rate on reads, or combinations thereof.

8. The optimized redundant array of solid state drives of claim 1, wherein said controller initiate global garbage collection on said array by communicating to each of said solid state drives a specified time to begin a garbage collection activity.

9. The optimized redundant array of solid state drives of claim 1, wherein said controller identifies one or more points in input/output stream associated with the solid state drives that are expected to have idle periods and initiates a global garbage collection activity to be performed during the identified one or more points.

10. A method of optimizing performance of a redundant array of individual solid state drives comprising:
   communicating, by a controller connected to the array, with said individual solid state drives; and
   coordinating, by said controller connected to the array, garbage collection activities of each of the individual solid-state drives.

11. The method of claim 10, further including:
   requesting said individual solid state drives, by the controller, to initiate the garbage collection activities, wherein garbage collection cycles begin on all the solid state drives in the array at a scheduled time.

12. The method of claim 10, wherein the communicating step includes one or more of said individual solid state drives notifying said controller of a need to perform garbage collection.

13. The method of claim 12, wherein the step of coordinating includes said controller requesting all of said individual solid state drives to begin garbage collection cycle.

14. The method of claim 12, wherein the step of coordinating includes said controller delaying until another notification from another of said individual solid state drives before requesting all of said individual solid state drives to begin garbage collection cycle.

15. The method of claim 10, further including:
   collecting periodically, by the controller connected to the array, information from said individual solid state drives, and the step of coordinating further includes coordinating based on said collected information.

16. The method of claim 15, wherein the step of collecting includes said controller pulling one or more of said individual solid state drives for said information, said individual solid state drives pushing said information to said controller, or combinations thereof.

17. The method of claim 10, further including:
   identifying one or more points in input/output stream that are expected to have idle periods, the input/output stream associated with the solid state drives; and
   initiating a global garbage collection activity to be performed during the identified one or more points.

18. A non-transitory computer readable storage medium storing a program of instructions executable by a machine to perform a method of optimizing performance of a redundant array of individual solid state drives, the method comprising:
   communicating, by a controller connected to the array, with said individual solid state drives; and
   coordinating, by said controller connected to the array, garbage collection activities of each of the individual solid-state drives using a controller connected to the array.

19. The non-transitory computer readable storage medium of claim 18, further including:
   requesting said individual solid state drives, by the controller, to initiate the garbage collection activities, wherein garbage collection cycles begin on all the solid state drives in the array at a scheduled time.

20. The non-transitory computer readable storage medium of claim 18, wherein the communicating step includes one or more of said individual solid state drives notifying said controller of a need to perform garbage collection.

21. The non-transitory computer readable storage medium of claim 20, wherein the step of coordinating includes said controller requesting all of said individual solid state drives to begin garbage collection cycle.

22. The non-transitory computer readable storage medium of claim 20, wherein the step of coordinating includes said controller delaying until another notification from another of said individual solid state drives before requesting all of said individual solid state drives to begin garbage collection cycle.

23. The non-transitory computer readable storage medium of claim 18, further including:
   collecting periodically, by the controller connected to the array, information from said individual solid state drives, and the step of coordinating further includes coordinating based on said collected information.

24. The non-transitory computer readable storage medium of claim 23, wherein the step of collecting includes said controller pulling one or more of said individual solid state drives for said information, said individual solid state drives pushing said information to said controller, or combinations thereof.

25. The non-transitory computer readable storage medium of claim 18, further including:
   identifying one or more points in input/output stream that are expected to have idle periods, the input/output stream associated with the solid state drives; and
   initiating a global garbage collection activity to be performed during the identified one or more points.

* * * * *